(12) United States Patent
Zhang et al.

(10) Patent No.: US 12,341,715 B2
(45) Date of Patent: Jun. 24, 2025

(54) BEARER CONTROL METHOD, TERMINAL, AND NETWORK SIDE DEVICE

(71) Applicant: VIVO MOBILE COMMUNICATION CO., LTD., Chang'an Dongguan (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 284 days.

(21) Appl. No.: 17/245,293

(22) Filed: Apr. 30, 2021

(65) Prior Publication Data

US 2021/0250139 A1 Aug. 12, 2021

Related U.S. Application Data

(63) Continuation of application No. PCT/CN2019/114665, filed on Oct. 31, 2019.

(30) Foreign Application Priority Data

Oct. 31, 2018 (CN) .......................... 201811285532.9

(51) Int. Cl.
*H04L 5/00* (2006.01)

(52) U.S. Cl.
CPC .......... *H04L 5/0032* (2013.01); *H04L 5/0098* (2013.01)

(58) Field of Classification Search
CPC ........................... H04L 5/0098; H04L 5/0032
See application file for complete search history.

(56) References Cited

U.S. PATENT DOCUMENTS

| 2017/0149546 A1 | 5/2017 | Zhang |
| 2018/0279262 A1 | 9/2018 | Babaei et al. |
| 2019/0104560 A1* | 4/2019 | Nuggehalli ....... H04W 28/0808 |
| 2020/0029379 A1 | 1/2020 | Xiao |
| 2020/0145171 A1 | 5/2020 | Jiang |

(Continued)

FOREIGN PATENT DOCUMENTS

| CN | 105519165 A | 4/2016 |
| CN | 107147479 A | 9/2017 |

(Continued)

OTHER PUBLICATIONS

CN 1st Office Action related to CN 201811285532.9 reported on Oct. 22, 2020.

(Continued)

*Primary Examiner* — Kevin M Cunningham
(74) *Attorney, Agent, or Firm* — von Briesen & Roper, s.c.

(57) ABSTRACT

The present disclosure provides a bearer control method, a terminal, and a network side device. A target radio bearer RB corresponding to the terminal is configured with a data duplication function, the target RB is configured with N transmission paths, N is an integer greater than 2, and the method includes: receiving an indication message sent by a network side device, where the indication message is used to indicate to activate or deactivate the data duplication function of the target RB, and/or is used to indicate to activate or deactivate a transmission path of the target RB; and determining an available transmission path of the target RB according to the indication message.

5 Claims, 6 Drawing Sheets

Receive an indication message sent by a network side device, wherein the indication message is used to indicate to activate or deactivate the data duplication function of the target RB, and/or is used to indicate to activate or deactivate a transmission path of the target RB — 301

Determine an available transmission path of the target RB according to the indication message — 302

(56) References Cited

U.S. PATENT DOCUMENTS

| | | | | |
|---|---|---|---|---|
| 2020/0275310 A1* | 8/2020 | Tang | ................ | H04W 28/0252 |
| 2021/0126746 A1* | 4/2021 | Li | ........................ | H04L 1/189 |
| 2021/0152296 A1 | 5/2021 | Chen | | |

FOREIGN PATENT DOCUMENTS

| | | |
|---|---|---|
| CN | 107342851 A | 11/2017 |
| CN | 108370304 A | 8/2018 |
| WO | 2018143600 A1 | 8/2018 |
| WO | 2018167358 A1 | 9/2018 |
| WO | 2018170891 A1 | 9/2018 |
| WO | 2018171512 A1 | 9/2018 |
| WO | 2020029137 A1 | 2/2020 |

OTHER PUBLICATIONS

CN 2nd Office Action related to CN 201811285532.9 reported on Oct. 12, 2021.
International Search Report and Written Report related to PCT/CN2019/114665 reported on May 14, 2021.
R2-1704660; Consideration on the activation/deactivation of data duplication for CA; 3GPP TSG-RAN WG2 Meeting #98; ZTE; Hangzhou, China, May 15-19, 2017.
R2-1807213; Open PDCP CR issues for PDCP duplication; 3GPP TSG RAN WG2 #102; Ericsson; Busan, South Korea, May 21-25, 2018.
R3-185879; Discussion on support for PDCP Duplication with More than 2 Copies; 3GPP TSG-RAN WG3 #101bis3GPP TSG-RAN WG3 #101bis; Ericsson; Chengdu, China, Oct. 8-12, 2018.
Extended European Search Report for related Application No. 19879682.3; reported on Dec. 9, 2021.
3rd Generation Partnership Project, "Technical Specification Group Radio Access Network; Evolved Universal Terrestrial Radio Access (E-UTRA); Medium Access Control (MAC) protocol specification (Release 15)", Sep. 2018, 3GPP TS 36.321 V15.3.0.
3rd Generation Partnership Project, "Technical Specification Group Radio Access Network; NR; NR and NG-RAN Overall Description; Stage 2 (Release 15)", Oct. 2018, 3GPP TS 38.300 V15.3.1.
3rd Generation Partnership Project, "Technical Specification Group Radio Access Network; NR; Medium Access Control (MAC) protocol specification (Release 15)", Sep. 2018, 3GPP TS 38.321 V15.3.0.
3rd Generation Partnership Project, "Technical Specification Group Radio Access Network; NR; Packet Data Convergence Protocol (PDCP) specification (Release 15)", Sep. 2018, 3GPP TS 38.323 V15.3.0.
Intel Corporation, "PDCP duplication with multiple RLC entities", Oct. 14-18, 2019, 3GPP TSG-RAN WG2 Meeting #107bis, Chongqing, China, R2-1912719.
CATT, "PDCP Duplication with More than 2 Copies", Oct. 8-12, 2018, 3GPP TSG-RAN WG3 #101bis, Chengdu, China, R3-185555.
Japanese Notice of Reasons for Refusal for related Application No. 2021-523615; reported on May 24, 2022.
Huawei, Hisilicon, "Link selection upon duplication deactivation", Aug. 21-5, 2017, 3GPP TSG-RAN2 #99, Berlin, Germany, R2-1707714.
Ericsson, "Resource efficient data duplication", Oct. 8-12, 2018, 3GPP TSG-RAN WG2 #103bis, Chengdu, China, Tdoc R2-1814814.
European Office Action related to Application No. 19879682.3; reported on Mar. 6, 2024.

* cited by examiner

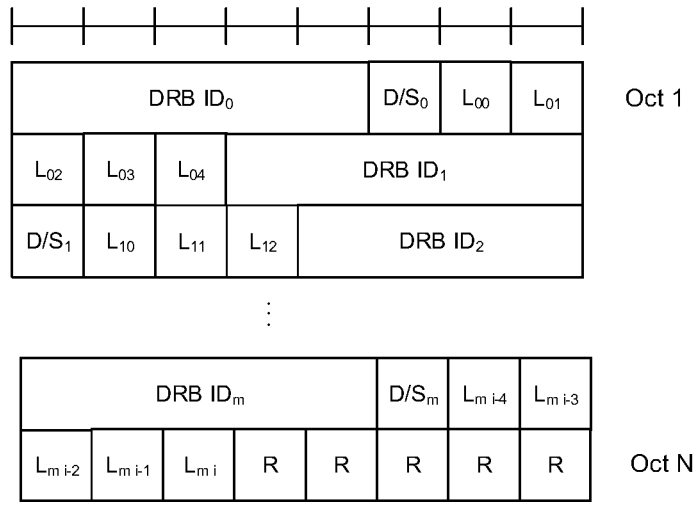

FIG. 5d

Send an indication message to a terminal, wherein the indication message is used to indicate to activate or deactivate the data duplication function of the target radio bearer RB corresponding to the terminal, and/or is used to indicate to activate or deactivate a transmission path of the target RB, the target RB is configured with a data duplication function, the target RB is configured with N transmission paths, and N is an integer greater than 2. — 601

FIG. 6

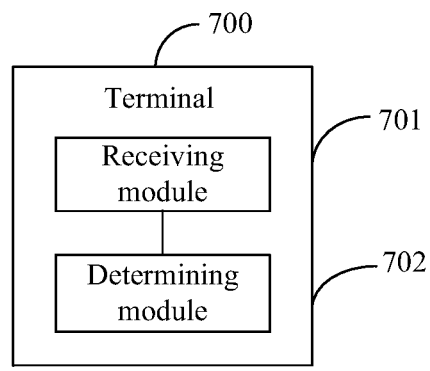

FIG. 7

BEARER CONTROL METHOD, TERMINAL, AND NETWORK SIDE DEVICE

CROSS-REFERENCE OF RELATED APPLICATION

The present application is a continuation application of International Application No. PCT/CN2019/114665 filed on Oct. 31, 2019, which claims priority of Chinese Patent Application No. 201811285532.9 filed in China on Oct. 31, 2018, both of which are incorporated herein by reference in their entireties.

TECHNICAL FIELD

Embodiments of the present disclosure relate to the field of communications technologies, and in particular, to a bearer control method, a terminal, and a network side device.

RELATED ART

In the new radio (New Radio, NR) technology, to improve the reliability of data transmission, a data duplication function is introduced in the packet data convergence protocol (Packet Data Convergence Protocol, PDCP) layer. The network side device can configure a duplication function for a radio bearer (Radio Bearer, RB) of UE, and the PDCP layer performs the function.

For the RB configured with the data duplication function, the network side device currently configures two transmission paths for a PDCP entity corresponding to the RB, and the reliability of data transmission is low.

SUMMARY

Embodiments of the present disclosure provide a bearer control method, a terminal, and a network side device, to resolve a problem of low reliability of data transmission in related technologies.

To resolve the foregoing problems, the present disclosure is implemented as follows:

According to a first aspect, the embodiments of the present disclosure provide a bearer control method, applied to a terminal, where a target radio bearer RB corresponding to the terminal is configured with a data duplication function, the target RB is configured with N transmission paths, N is an integer greater than 2, and the method includes:
  receiving an indication message sent by a network side device, where the indication message is used to indicate to activate or deactivate the data duplication function of the target RB, and/or is used to indicate to activate or deactivate a transmission path of the target RB; and
  determining an available transmission path of the target RB according to the indication message.

According to a second aspect, the embodiments of the present disclosure provide a bearer control method, applied to a network side device, where the method includes:
  sending an indication message to a terminal, where the indication message is used to indicate to activate or deactivate the data duplication function of the target radio bearer RB corresponding to the terminal, and/or is used to indicate to activate or deactivate a transmission path of the target RB;
  where the target RB is configured with a data duplication function, the target RB is configured with N transmission paths, and N is an integer greater than 2.

According to a third aspect, the embodiments of the present disclosure further provide a terminal, where a target radio bearer RB corresponding to the terminal is configured with a data duplication function, the target RB is configured with N transmission paths, N is an integer greater than 2, and the terminal includes:
  a receiving module, configured to receive an indication message sent by a network side device, where the indication message is used to indicate to activate or deactivate the data duplication function of the target RB, and/or is used to indicate to activate or deactivate a transmission path of the target RB; and
  a determining module, configured to determine an available transmission path of the target RB according to the indication message.

According to a fourth aspect, the embodiments of the present disclosure provide a network side device, including:
  a sending module, configured to send an indication message to a terminal, where the indication message is used to indicate to activate or deactivate the data duplication function of the target radio bearer RB corresponding to the terminal, and/or is used to indicate to activate or deactivate a transmission path of the target RB;
  where the target RB is configured with a data duplication function, the target RB is configured with N transmission paths, and N is an integer greater than 2.

According to a fifth aspect, the embodiments of the present disclosure further provide a terminal, including a processor, a memory, and a computer program stored in the memory and executable on the processor, where the computer program, when executed by the processor, implements the steps of the bearer control method according to the first aspect.

According to a sixth aspect, the embodiments of the present disclosure further provide a network side device, including: a processor, a memory, and a computer program stored in the memory and executable on the processor, where the computer program, when executed by the processor, implements the steps of the bearer control method according to the second aspect.

According to a seventh aspect, the embodiments of the present disclosure further provide a computer-readable storage medium. The computer-readable storage medium stores a computer program. The computer program, when executed by a processor, implements the steps of the bearer control method according to the first aspect or the steps of the bearer control method according to the second aspect.

In the embodiments of the present disclosure, a target radio bearer RB corresponding to the terminal is configured with a data duplication function, the target RB is configured with N transmission paths, and N is an integer greater than 2. Further, the terminal may determine an available transmission path of the target RB according to the received indication message sent by a network side device, where the indication message is used to indicate to activate or deactivate the data duplication function of the target RB, and/or is used to indicate to activate or deactivate a transmission path of the target RB. In this way, the present disclosure can improve the reliability of determining the available transmission path of the target RB. In addition, when the terminal uses the available transmission path of the target RB for data transmission, the success rate of data transmission can be also improved and therefore the reliability of data transmission can be improved. Therefore, the present disclosure can improve the performance of data transmission.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

FIG. 5d is a schematic diagram 3 of a body of second MAC CE signaling according to an embodiment of the present disclosure;

FIG. 6 is a flowchart 2 of a bearer control method according to an embodiment of the present disclosure;

FIG. 7 is a structural diagram 1 of a terminal according to an embodiment of the present disclosure;

DETAILED DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Terms "first" and "second" in this application are used to distinguish between similar objects, and do not need to be used to describe a specific order or sequence. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in this application indicates at least one of connected objects. For example, A and/or B and/or C represents the following seven cases: only A exists, only B exists, only C exists, both A and B exist, both B and C exist, both A and C exist, and A, B, and C all exist.

Figure 1:
FIG. 1 is a structural diagram of a network system to which embodiments of the present disclosure can be applied.

Referring to FIG. 1, FIG. 1 is a structural diagram of a network system to which an embodiment of the present disclosure can be applied. As shown in FIG. 1, the network system includes a terminal 11 and a network side device 12. The terminal 11 and the network side device 12 may communicate with each other through a network.

In the embodiments of the present disclosure, the terminal 11 may be referred to as a user terminal (User Equipment, UE), and may be specifically a terminal side device such as a mobile phone, a tablet personal computer (Tablet Personal Computer), a laptop computer (Laptop Computer), a personal digital assistant (personal digital assistant, PDA), a mobile internet device (Mobile Internet Device, MID), a wearable device (Wearable Device), or a vehicle-mounted device. It should be noted that a specific type of the terminal 11 is not limited in this embodiment of the present disclosure.

The network side device 12 may be a base station, a relay, an access point, or the like. For example, the network side device 12 may be a serving base station in a single connection architecture, a master node in a multi-connection architecture, or a secondary node in a multi-connection architecture. The base station may be a base station (for example, a 5G NR NB) of 5G and later versions, or a base station (for example, eNB (evolved NodeB, evolved NodeB)) in another communications system. It should be noted that a specific type of the network side device 12 is not limited in the embodiments of the present disclosure.

For ease of description, the following describes some content in the embodiments of the present disclosure:

1. Introduction of a PDCP Duplication (PDCP Duplication) Function.

In NR, to improve the reliability of data transmission, the data duplication function is introduced at a PDCP layer. The network side device can configure a data duplication function for an RB of UE, and the PDCP layer performs the function. If the data duplication function of an RB is activated, the PDCP layer corresponding to the RB duplicates data that needs to be submitted to the lower layer, and sends original data and the duplicated data through two different transmission paths such as two different radio link control (Radio Link Control, RLC) entities. Different RLC entities correspond to different logical channels.

In an implementation, the network side device can indicate to start (i.e. activate) or stop (i.e. deactivate) the data duplication function of PDCP through medium access control control element (Medium Access Control Control Element, MAC CE) signaling.

In another implementation, when the network side device configures the data duplication function of an RB, the network side device can configure whether the function is enabled immediately after configuration, so that there is no need to use the MAC CE signaling to indicate to activate or deactivate the PDCP replication function.

2. Bearer Type of the PDCP Duplication Function

In a 5th generation (5th-Generation, 5G) mobile communications system, a DC architecture is used. In the DC architecture, there are two cell groups: a master cell group (Master Cell Group, MCG) and a secondary cell group (Secondary Cell Group, SCG). The MCG corresponds to a master node (Master Node, MN) of the network side device, and the SCG corresponds to a secondary node (secondary node, SN) of the network side device. The network side device can configure multiple signaling radio bearers (Signaling Radio Bearer, SRB) for the UE, including an SRB1 and an SRB2 configured in the MCG and an SRB3 configured in the SCG.

The bearer type of PDCP duplication function can include at least the following two types of bearers:

A split bear (split bear): a PDCP entity corresponding to a same split bearer is in one cell group, and two RLC entities and two MAC entities corresponding to a same split bearer are in different cell groups.

Figure 2A:
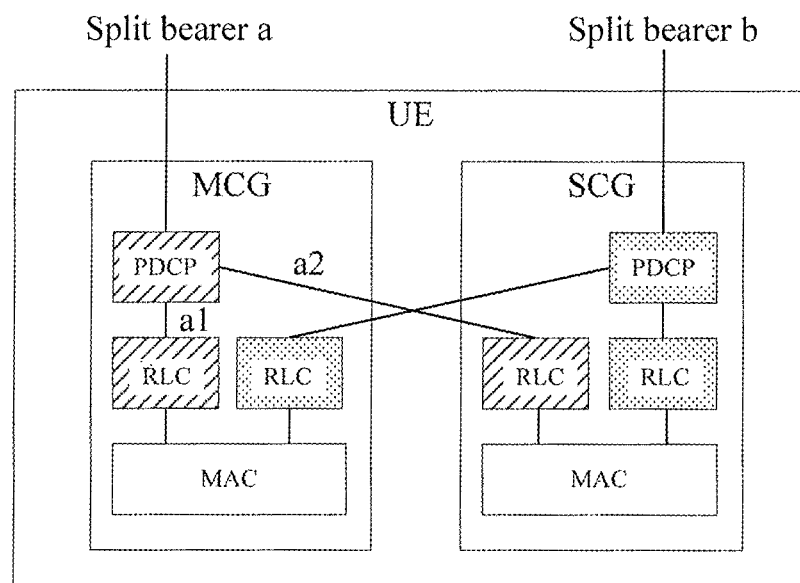
FIG. 2a is a schematic diagram 1 of a bearer according to an embodiment of the present disclosure.

For example, as shown in FIG. 2a, a split bearer a is used as an example. The split bearer a is configured with a transmission path a1 and a transmission path a2, where the transmission path a1 corresponds to a PDCP entity in the MCG, an RLC entity 1 in the MCG, and a MAC entity in the MCG, and the transmission path a2 corresponds to a PDCP entity in the MCG, an RLC entity 1 in the SCG, and a MAC entity in the SCG.

Duplicate bearer (Duplicate bearer): one PDCP entity, two RLC entities, and one MAC entity corresponding to a same duplicate bearer are in one cell group.

Figure 2B:
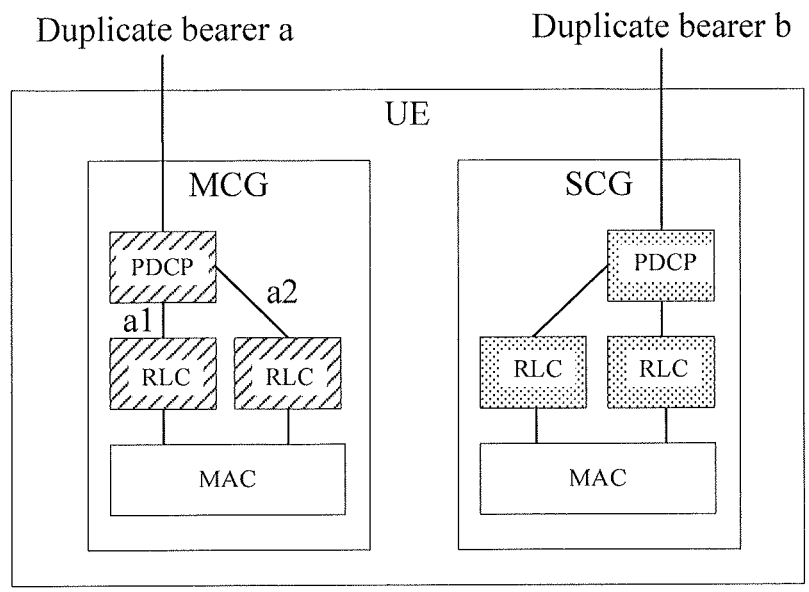
FIG. 2b is a schematic diagram 2 of a bearer according to an embodiment of the present disclosure.

For example, as shown in FIG. 2b, a duplicate bearer a is used as an example. The duplicate bearer a is configured with a transmission path a1 and a transmission path a2, where the transmission path a1 corresponds to a PDCP entity in the MCG, an RLC entity 1 in the MCG, and a MAC entity in the MCG, and the transmission path a2 corresponds to a PDCP entity in the MCG, an RLC entity 2 in the MCG, and a MAC entity in the MCG.

In addition, for a duplicate bearer, data from different RLC entities can be sent through different cells, and the cells used to transmit data can be a secondary cell (Secondary Cell, SCell) or a primary cell (Primary Cell, PCell).

It should be noted that in the embodiments of the present disclosure, if RLC entities corresponding to a bearer are in different cell groups, the bearer can be called a split bearer; and if RLC entities corresponding to a bearer are in a same cell, the bearer can be called a duplicate bearer. However, a standard organization may give other names to it, and the present disclosure is not affected by names.

In the embodiments of the present disclosure, the target RB corresponding to the terminal is configured with a data duplication function, the target RB is configured with N transmission paths, and N is an integer greater than 2. Therefore, it is understandable that when the data duplication function of the target RB is activated, the terminal can perform data transmission through N transmission paths.

However, the number of transmission paths is positively related to network resources required by UE to send data, that is, more transmission paths indicate more network resources required by UE to send data. Therefore, when the terminal performs data transmission through N transmission paths, more network resources are needed, which leads to low resource utilization.

To improve resource utilization, the embodiments of the present disclosure provide a bearer control method, to determine the available transmission path in N transmission paths of the target RB and perform data transmission through the available transmission path. It should be understood that the number of available transmission paths is less than or equal to N. In this way, the bearer control method in the embodiments of the present disclosure can improve the data transmission function. When the number of available transmission paths is less than N, compared with the data transmission through N transmission paths, network resources occupied by UE can be reduced and therefore resource utilization can be improved.

It should be noted that the bearer control method in the embodiments of the present disclosure can be applied to a dual connectivity (Dual Connectivity, DC) and/or carrier aggregation (Carrier Aggregation, CA) architecture. That is, the present disclosure can utilize at least one of dual connectivity (Dual Connectivity, DC) and carrier aggregation (Carrier Aggregation, CA) to study PDCP data duplication for more than 2 duplicates.

The following describes the bearer control method in the embodiments of the present disclosure.

Figure 3:
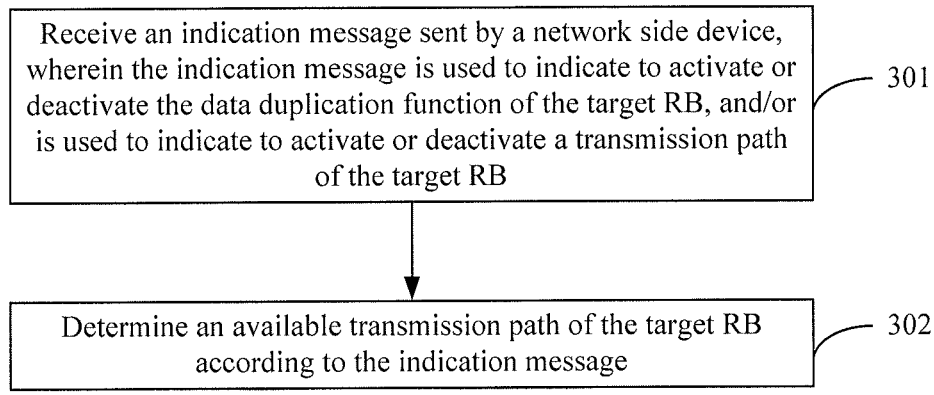
FIG. 3 is a flowchart 1 of a bearer control method according to an embodiment of the present disclosure.

Referring to FIG. 3, FIG. 3 is a flowchart 1 of a bearer control method according to an embodiment of the present disclosure. The bearer control method in this embodiment can be applied to a terminal. As shown in FIG. 3, the bearer control method in this embodiment may include the following steps.

Step 301: Receive an indication message sent by a network side device, where the indication message is used to indicate to activate or deactivate the data duplication function of the target RB, and/or is used to indicate to activate or deactivate a transmission path of the target RB.

It should be noted that in the embodiments of the present disclosure, when the indication message is used to indicate to activate or deactivate the transmission path of a target RB, the indication message may indicate to activate or deactivate all transmission paths of the target RB, or indicate to activate or deactivate some transmission paths of the target RB. Details may be determined according to an actual requirement, and are not limited in the embodiments of the present disclosure.

During specific implementation, the indication message optionally is:
radio resource control RRC signaling; or
first media access control control element MAC CE signaling, where the first MAC CE signaling is used to indicate to activate or deactivate the data duplication function of the target RB; or
second MAC CE signaling, where the second MAC CE signaling is used to indicate to activate or deactivate a transmission path of the target RB.

The following is a detailed description of the indication message based on a specific representation form of the indication message.

Manner 1: The Indication Message is Radio Resource Control (Radio Resource Control, RRC) Signaling.

The RRC signaling may be used to indicate to activate or deactivate the data duplication function of the target RB, and/or is used to indicate to activate or deactivate a transmission path of the target RB.

Specifically, when RRC signaling is used to indicate to activate or deactivate the data duplication function of the target RB, the RRC signaling can indicate to activate or deactivate the data duplication function of the target RB through one bit. Further, the bit in the RRC signaling can be carried in the PDCP configuration information element (PDCP-configuration IE). However, the present disclosure does not restrict the position of the bit in the RRC signaling.

For example, when the bit value of RRC signaling is "1", the RRC signaling is used to indicate to activate the data duplication function of the target RB; and when the bit value of RRC signaling is "0", the RRC signaling is used to indicate to deactivate the data duplication function of the target RB.

It should be noted that in the embodiments of the present disclosure, the transmission path can be identified by at least one of the following: a cell group identifier and/or a logical channel identifier. Therefore, when RRC signaling is used to indicate to activate or deactivate the transmission path of the target RB, the RRC signaling can indicate to activate or deactivate the transmission path of the target RB through a cell group identifier and/or a logical channel identifier.

For example, when RRC signaling carries a first cell group identifier and/or a first logical channel identifier and the first cell group identifier and/or the first logical channel identifier identifies a first transmission path, in one implementation, the RRC signaling can be used to indicate to activate the first transmission path. In another embodiment, the RRC signaling can be used to indicate to deactivate the first transmission path.

Manner 2: The Indication Message is First MAC CE Signaling.

The first MAC CE signaling is used to indicate to activate or deactivate the data duplication function of the target RB. In other words, the first MAC CE signaling activates or deactivates the data duplication function of the target RB (that is, MAC CE per RB) based on a granularity of a bearer.

Figure 4:
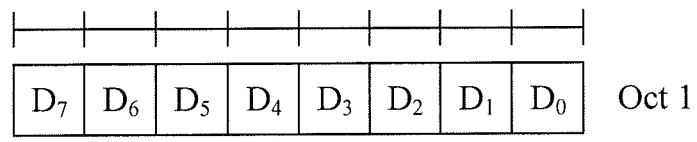
FIG. 4 is a schematic diagram of first MAC CE signaling according to an embodiment of the present disclosure.

For specific implementation, the signaling format of the first MAC CE can be shown in FIG. 4. In FIG. 4, the first MAC CE signaling can include a Di field, and the Di field can be used to indicate whether the data duplication function of an RB (such as DRB) with a sequence number i is activated.

For example, if the Di field value is "1", it indicates that the data duplication function of the RB with the sequence number i is activated; if the Di field value is "0", it indicates that the data duplication function of the RB with the sequence number i is deactivated.

It should be noted that FIG. 4 is only an example, and the embodiments of the present disclosure do not limit the format of the first MAC CE signaling.

Manner 3: The Indication Message is Second MAC CE Signaling.

The second MAC CE signaling is used to indicate to activate or deactivate a transmission path of the target RB. In other words, the second MAC CE signaling activates or deactivates the transmission path of the target RB based on the granularity of the transmission path (i.e., MAC CE per leg).

In specific implementation, optionally, the second MAC CE signaling includes: a cell group identifier and/or a logical channel identifier; or the second MAC CE signaling includes: a first field used to identify the target RB, and a second field used to indicate a status of a transmission path whose sequence number is i among the N transmission paths of the target RB, where i is an integer greater than or equal to 0 and less than or equal to N.

Scenario 1: The Second MAC CE Signaling Includes: A Cell Group Identifier and/or a Logical Channel Identifier.

In this implementation, the second MAC CE signaling may include a third field used to identify the transmission path of the target RB. Because a cell group identifier and/or a logical channel identifier can be used to uniquely identify a transmission path, in an implementation, the second MAC CE signaling can include: a cell group identifier and/or a logical channel identifier. However, it should be understood that in other implementations, the second MAC CE signaling can include other identifiers that can be used to identify the transmission path of the target RB, and this is not limited in the embodiments of the present disclosure.

During specific implementation, the second MAC CE signaling can activate or deactivate the transmission path identified by a cell group identifier and/or a logical channel identifier. For example, assuming that the target RB is configured with a transmission path 1, a transmission path 2, and a transmission path 3, if a cell group identifier and/or a logical channel identifier can identify the transmission path 2, the second MAC CE signaling can be used to indicate to activate the transmission path 2.

Scenario 2: The Second MAC CE Signaling Includes: A First Field Used to Identify the Target RB, and a Second Field Used to Indicate a Status of a Transmission Path Whose Sequence Number is i Among the N Transmission Paths of the Target RB.

In this scenario, UE can determine the status of the transmission path with the sequence number i among the N transmission paths of the target RB according to the first field and the second field.

In the specific implementation, if the first field identifies the target RB and the value of the second field is "1", it can indicate that the status of the transmission path whose sequence number is i among the N transmission paths of the target RB is an activated status; if the first field identifies the target RB and the value of the second field is "0", it can indicate that the status of the transmission path whose sequence number is i among the N transmission paths of the target RB is a deactivated status.

In manner 3, further, when the target RB is a split bearer, the second MAC CE further includes a split bearer indicator field, used to indicate whether the target RB deactivates the data duplication function and falls back to a split bearer mode.

In specific implementation, if the value of the split bearer indicator field is "0", it may indicate that the target RB does not fall back to a split bearer mode and is in a data duplication activated mode; if the value of the split bearer indicator field is "1", it may indicate that the target RB deactivates the data duplication function and falls back to the split bearer mode and is in the split bearer mode.

When the target RB is in the split bearer mode, the data duplication function of the target RB is in the deactivated state. UE can pre-determine the available transmission path of the target RB in a split bearer mode and perform data transmission through the available transmission path.

It should be noted that in the embodiments of the present disclosure, the second MAC CE signaling corresponds to a MAC entity. In the specific implementation, the second MAC CE signaling can be used to indicate to activate or deactivate a transmission path of a bearer associated with the MAC entity corresponding to the second MAC CE signaling. For ease of understanding, example descriptions are as follows:

It is assumed that transmission paths of RB1 are all in the MCG, transmission paths of RB2 are in the MCG and the SCG, and transmission paths of RB3 are all in the SCG. From another perspective, the MAC entity of the MCG is associated with the RB1 and the RB2, and the MAC entity of the SCG is associated with the RB2 and the RB3. Under this condition, if the second MAC CE signaling corresponding to the MAC entity of the MCG is received, the second MAC CE signaling can be used to indicate to activate or deactivate the transmission paths of RB1 and RB2; if the second MAC CE signaling corresponding to the MAC entity of the SCG is received, the second MAC CE signaling can be used to indicate to activate or deactivate the transmission paths of RB2 and RB3.

In practical application, the second MAC CE signaling can include a MAC CE subheader and a MAC CE body. For the format of the MAC CE subheader, refer to FIG. 5*a*, and for the MAC CE body, refer to FIG. 5*b*, FIG. 5*c*, and FIG. 5*d*. It should be noted that the second MAC CE signaling corresponding to FIG. 5*b* is the second MAC CE signaling of scenario 1, and the second MAC CE signaling corresponding to FIG. 5*c* and FIG. 5*d* is the second MAC CE signaling of scenario 2.

Figure 5A:
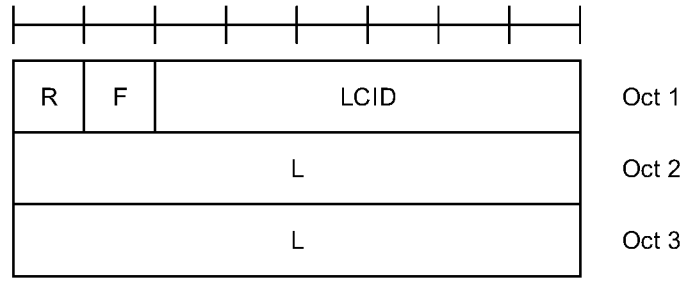
FIG. 5a is a schematic diagram of a subheader of second MAC CE signaling according to an embodiment of the present disclosure.
Figure 5B:
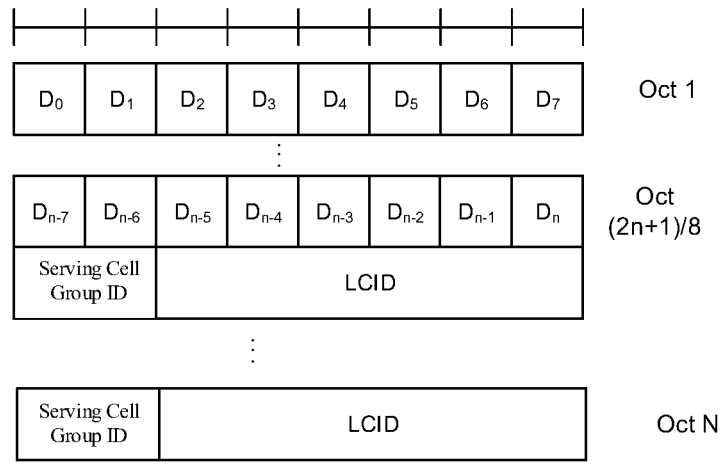
FIG. 5b is a schematic diagram 1 of a body of second MAC CE signaling according to an embodiment of the present disclosure.
Figure 5C:
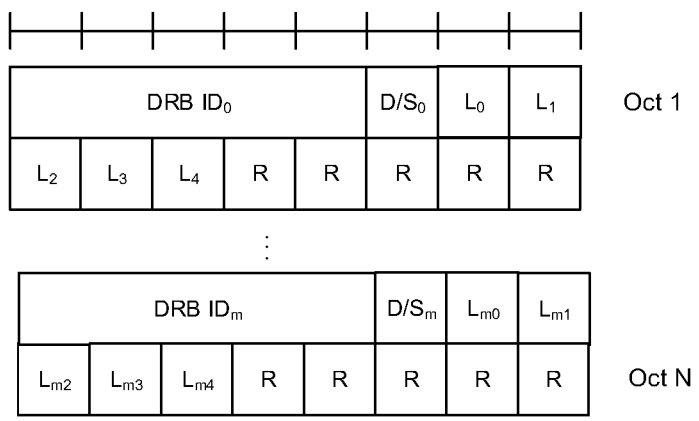
FIG. 5c is a schematic diagram 2 of a body of second MAC CE signaling according to an embodiment of the present disclosure.

As shown in FIG. 5a, the MAC CE subheader can include a field R, a field F, a field LCID, and a field L.

The field R is a reserved bit.

As shown in FIG. 5a, the field R can be arranged in the first bit of Oct (byte) 1.

The field F is used to indicate the length of the field L with a unit of byte. For example, when the value of the field F is "0", it indicates that the length of the field L is one byte, and when the value of the field F is "1", it indicates that the length of the field L is two bytes. As shown in FIG. 5a, the field F can be arranged in the second bit of Oct1.

The field LCID is used to indicate the type of MAC CE signaling corresponding to the subheader, such as MAC CE signaling for activating or deactivating the data duplication function. A value of the field LCID can reuse the LCID value that is in first MAC CE signaling and that is used to indicate the type of the first MAC CE signaling, or can be a newly introduced LCID value. Details may be determined according to an actual requirement, and are not limited in the embodiments of the present disclosure. As shown in FIG. 5a, the field LCID can be arranged in the last six bytes of Oct1.

The field L is used to indicate the length of a MAC CE that becomes longer. As shown in FIG. 5a, the field L can be arranged in Oct2 and Oct3.

As shown in FIG. 5b, the MAC CE body includes a field Dn, a serving cell group identifier (Serving Cell Group ID) field, and an LCID field.

The Dn field is used to identify whether an RB with a sequence number n is in a data duplication activated mode or a split bearer mode, and can be equivalent to the foregoing split bearer indicator field. For example, if the value of Dn field is "0", it can indicate that the RB is in the data duplication function activated mode; and if the value of the Dn field is "1", it can indicate that the RB is in the split bearer mode.

The Dn field can be arranged in ascending order according to a data radio bearer (Data Radio Bearer, DRB) identifier of the radio bearer configured with the data duplication function.

It should be noted that an RB identified by Dn field needs to meet the following condition: the RB has a corresponding RLC entity that belongs to a cell group of a MAC entity receiving the MAC CE signaling. In the embodiments of the present disclosure, the second MAC CE signaling can be used to indicate to activate or deactivate the transmission path of the target RB. It indicates that the target RB meets the following condition: the RLC entity corresponding to the target RB includes an RCL entity that belongs to the same cell group as the MAC entity receiving the second MAC CE signaling.

The serving cell group ID field can be used to identify a cell group identifier, and the LCID field can be used to identify a logical channel identifier. It should be understood that the serving cell group ID field and/or the LCID field can uniquely identify a transmission path.

Specifically, when the target RB is in the data duplication activated mode, if the second MAC CE signaling carries a field identifying the transmission path associated with the target RB, the transmission path identified by the field in the target RB can be activated; otherwise, the transmission path is deactivated by default. When the target RB is in a split bearer mode (that is, a data duplication function deactivated mode), if the second MAC CE signaling carries a field identifying a transmission path associated with the radio bearer, it indicates that the transmission path identified by the field in the target RB is an available transmission path; otherwise, the transmission path is not an available transmission path.

As shown in FIG. 5c and FIG. 5d, the MAC CE body includes a D/Sm field, a DRB IDm field, an Lmi field, and an R field.

The field R is a reserved bit.

The D/Sm field can be used to identify whether an RB with a sequence number m is in a data duplication activated mode or a split bearer mode. For example, when the D/Sm field value is "0", it indicates that the RB with the sequence number m is in the data duplication activated mode; when the D/Sm field value is "1", it indicates that the RB with the sequence number m is in the split bearer mode.

The DRB IDm field can be used to identify an RB identifier configured with the data duplication function, and can be equivalent to the foregoing first field.

Lmi indicates whether the transmission path with the sequence number i associated with the radio bearer identified by the DRB IDm is activated, and can be equivalent to the foregoing second field. For example, when the value of Lmi is "1", it indicates that the transmission path with a sequence number i is activated; and when the value of Lmi is "0", it indicates that the transmission path with a sequence number i is deactivated.

Numbering rules for transmission paths associated with RBs are: transmission paths in different cell groups can be numbered in ascending order of cell group identifiers; and transmission paths in the same cell group can be numbered in ascending order according to LCIDs corresponding to the transmission paths.

It should be noted that in practical application, the format of the second MAC CE signaling can be shown in FIG. 5a and FIG. 5b, or shown in FIG. 5a and FIG. 5c, or shown in FIG. 5a and FIG. 5d. However, it should be understood that the formats of FIG. 5a, FIG. 5b, FIG. 5c, and FIG. 5d are only examples. The embodiments of the present disclosure do not limit the specific form of the second MAC CE signaling.

Step 302: Determine an available transmission path of the target RB according to the indication message.

As can be seen from the above content, after the network side device configures the data duplication function for the target RB, the PDCP entity corresponding to the target RB performs the data duplication function and transmits data through the available transmission path of the target RB.

Therefore, optionally, the determining an available transmission path of the target RB according to the indication message includes:

sending, by an entity receiving the indication message in the terminal, indication information to a PDCP entity corresponding to the target RB, where the indication information is determined according to the indication message; and determining, by the PDCP entity, the available transmission path of the target RB according to the indication information.

In the specific implementation, UE can determine the indication information according to the specific form and specific indicted content of the received indication message, and then determine the available transmission path of the target RB. Details are described as follows:

Implementation 1:

In this implementation, the indication message is RRC signaling, and the RRC signaling indicates to deactivate the data duplication function of the target RB. Therefore, it can be determined that the entity receiving the indication message is an RRC entity, and the indication information is used to indicate that the data duplication function of the target RB is already deactivated.

Optionally, the determining, by the PDCP entity, the available transmission path of the target RB according to the indication information includes:

determining a transmission path of the target RB preconfigured by the network side device as the available transmission path of the target RB according to the indication information; or when the target RB is a split bearer, controlling, according to the indication information, the target RB to switch to a split bearer mode, and determining a transmission path in the split bearer mode as the available transmission path of the target RB.

In this way, when data is transmitted through the available transmission path of the target RB, not only the reliability of data transmission can be improved, but also the resource utilization can be improved.

Implementation 2:

In this implementation, the indication message is RRC signaling, and the RRC signaling indicates to activate j transmission paths of the target RB. Therefore, it can be determined that the entity receiving the indication message is an RRC entity, the indication information includes the j transmission paths, and j is a positive integer less than or equal to N.

Optionally, the determining, by the PDCP entity, the available transmission path of the target RB according to the indication information includes:

determining the j transmission paths as the available transmission path of the target RB.

In this way, when data is transmitted through the available transmission path of the target RB, not only the reliability of data transmission can be improved, but also the resource utilization can be improved.

Implementation 3:

In this implementation, the indication message is first MAC CE signaling, and the first MAC CE signaling indicates to deactivate the data duplication function of the target RB. Therefore, it can be determined that the entity receiving the indication message is a MAC entity, and the indication information is used to indicate that the data duplication function of the target RB is already deactivated.

Optionally, the determining, by the PDCP entity, the available transmission path of the target RB according to the indication information includes:

determining a transmission path of the target RB preconfigured by the network side device as the available transmission path of the target RB according to the indication information; or when the target RB is a split bearer, controlling, according to the indication information, the target RB to switch to a split bearer mode, and determining a transmission path in the split bearer mode as the available transmission path of the target RB.

It should be noted that the method for determining the available transmission paths of the target RB in this implementation is the same as that in the implementation 1, and a difference lies in that the specific form of the indication message is the first MAC CE signaling. Correspondingly, the entity receiving the indication message is a MAC entity.

In this way, when data is transmitted through the available transmission path of the target RB, not only the reliability of data transmission can be improved, but also the resource utilization can be improved.

Implementation 4:

In this implementation, the indication message is second MAC CE signaling. Therefore, it can be determined that the entity receiving the indication message is a MAC entity. The indication information includes: m transmission paths in a deactivated state and/or n transmission paths in an activated state, m and n are positive integers, $m+n \leq N$, and the m transmission paths in the deactivated state and/or the n transmission paths in the activated state are determined according to the second MAC CE signaling.

Optionally, the determining, by the PDCP entity, the available transmission path of the target RB according to the indication information includes:

when the indication information includes the n transmission paths in the activated state, determining the n transmission paths in the activated state as the available transmission path of the target RB; or when the indication information includes only the m transmission paths in the deactivated state, determining a transmission path among the N transmission paths of the target RB other than the m transmission paths in the deactivated state as the available transmission path.

In practical application, the second MAC CE signaling can be represented as activation signaling, and the second MAC CE signaling can include a cell group identifier and/or a logical channel identifier that can be used to represent the n transmission paths of the target RB in the activated state. In this application scenario, the second MAC CE signaling can be used to indicate to activate the n transmission paths of the target RB in the activated state.

The second MAC CE signaling can be represented as deactivation signaling, and the second MAC CE signaling can include a cell group identifier and/or a logical channel identifier that can be used to represent the m transmission paths of the target RB in the deactivated state. In this application scenario, the second MAC CE signaling can be used to indicate to deactivate the m transmission paths of the target RB in the deactivated state.

Therefore, the m transmission paths in the deactivated state and/or the n transmission paths in the activated state included in the indication information can be determined according to the second MAC CE signaling.

When the indication information includes the n transmission paths in the activated state, the n transmission paths in the activated state are determined as the available transmission path of the target RB. In the specific implementation, the n transmission paths in the activated state can be added to the set of available transmission paths of the target RB.

When the indication information includes only the m transmission paths in the deactivated state, a transmission path among the N transmission paths of the target RB other than the m transmission paths in the deactivated state may be determined as the available transmission path. In the specific implementation, the m transmission paths in the deactivated state can be removed from the set of available transmission paths of the target RB.

In this way, when data is transmitted through the available transmission path of the target RB, not only the reliability of data transmission can be improved, but also the resource utilization can be improved.

In the bearer control method of this embodiment, the terminal can determine the available transmission path of the target RB based on the indication message sent by the network side device, so as to improve the reliability of determining the available transmission path of the target RB. In addition, when the terminal uses the available transmission path of the target RB for data transmission, not only the success rate of data transmission can be also improved and therefore the reliability of data transmission can be improved, but also the resource utilization can be improved. Therefore, the present disclosure can improve the performance of data transmission.

It should be noted that multiple optional implementations described in this embodiments of the present disclosure may be implemented in combination with each other, or may be separately implemented. This is not limited in this embodiment of the present disclosure.

For the convenience of understanding, an example is described as follows, and the bearer control method in this embodiment of the present disclosure may include the following steps.

Step 1: The network side device delivers an activation or deactivation indication of the data duplication function to the UE. It should be understood that "the activation or deactivation indication of the data duplication function" in this step can be equivalent to "the indication message" in the above method embodiment.

The activation or deactivation indication of the data duplication function can be any of the following:
  RRC signaling;
  legacy duplication activation/deactivation MAC CE signaling; and
  newly introduced duplication activation/deactivation MAC CE signaling.

It should be noted that the "legacy duplication activation/deactivation MAC CE signaling" can be equivalent to the first MAC CE signaling in the foregoing method embodiment; and the "newly introduced duplication activation/deactivation MAC CE signaling" can be equivalent to the second MAC CE signaling in the foregoing method embodiment.

The RRC signaling indicating the activation or deactivation of the duplication function can be indicated by one bit and can be carried in PDCP-config IE. For example, the value of "1" indicates that the data duplication function of a radio bearer is activated, and then original data and duplicated data corresponding to the radio bearer can be transmitted through N RLC entities associated with the bearer. The value of "0" indicates that the data duplication function of a radio bearer is deactivated, data corresponding to the radio bearer is transmitted through a transmission path of the radio bearer preconfigured by the network side device or the radio bearer falls back to a split bearer operation mode. In an implementation, the RRC signaling can be used to indicate to activate and/or deactivate one or more transmission paths of a radio bearer.

If the legacy duplication activation/deactivation MAC CE signaling indicates to activate the data duplication function of a radio bearer, original data and duplicated data corresponding to the radio bearer can be transmitted through N RLC entities associated with the bearer. If the legacy duplication activation/deactivation MAC CE signaling indicates to deactivate the data duplication function of a radio bearer, data corresponding to the radio bearer is transmitted through a transmission path preconfigured in a network or the radio bearer falls back to a split bearer operation mode.

If an activation/deactivation indication is the newly introduced duplication activation/deactivation MAC CE signaling, the MAC CE signaling is on per-MAC-entity basis, that is, the MAC CE signaling corresponds to an RLC entity. The format of the MAC CE signaling is illustrated in examples as follows:

Example 1

The subheader of the MAC CE signaling can be shown in FIG. 5a.

R is a reserved bit. F field is used to indicate the length of L field, for example, the value of "0" indicates that the length of L field is one byte, and the value of "1" indicates that the length of L field is two bytes. The L field is used to indicate the length of a duplication function activation/deactivation MAC CE that becomes longer (in byte). The LCID field is used to indicate that the MAC CE corresponding to the subheader is a duplication function activation/deactivation MAC CE. An LCID value can reuse an LCID value of the duplication function activation/deactivation MAC CE identified as legacy, or can be a newly introduced LCID value to identify a multipath duplication function activation/deactivation MAC CE.

The MAC CE signaling body can be shown in FIG. 5b.

The Dn field indicates whether an RB with a sequence number n is in a data duplication activated mode or a split bearer mode. For example, the value of "0" indicates that the radio bearer is in the data duplication function mode; and if the value of "1" indicates that the radio bearer needs to be switched to the split bearer mode.

The Dn field can be arranged in ascending order according to a DRB ID of the radio bearer configured with the data duplication function. The radio bear configured with the data duplication function needs to meet the following condition: the RB has a corresponding RLC entity that belongs to a cell group of a MAC entity receiving the MAC CE.

The serving cell group ID field can be used to represent a cell group identifier, the LCID field represents a logical channel identifier, and the serving cell group ID field and/or the LCID field uniquely identifies a transmission path. When a radio bearer is in the data duplication activated mode, if a MAC CE carries a field identifying a transmission path associated with the radio bearer, it indicates that a corresponding transmission path is activated; otherwise, a corresponding transmission path is deactivated by default. When a radio bearer is in the split bearer mode, if the MAC CE carries a field identifying a transmission path associated with the radio bearer, it indicates that the transmission path is available in the split bearer mode; otherwise, the transmission path is not available.

Example 2

The subheader of the MAC CE signaling can be shown in FIG. 5a.

R is a reserved bit. F field is used to indicate the length of L field, for example, the value of "0" indicates that the length of L field is one byte, and the value of "1" indicates that the length of L field is two bytes. The L field is used to indicate the length of a duplication function activation/deactivation MAC CE that becomes longer (in byte). The LCID field is used to indicate that the MAC CE corresponding to the subheader is a duplication function activation/deactivation MAC CE. An LCID value can reuse an LCID value of the duplication function activation/deactivation MAC CE identifying legacy, or can be a newly introduced LCID value to identify a multipath duplication function activation/deactivation MAC CE.

The MAC CE signaling body can be shown in FIG. 5c or FIG. 5d.

The D/Sm field is used to identify whether a radio bearer with a sequence number m is in a data duplication activated mode or a split bearer mode. For example, the value of "0"

indicates the data duplication activated mode, and the value of "1" indicates the split bearer mode.

The DRB IDm field indicates a radio bearer identifier configured with the data duplication function. Lmi indicates whether the transmission path with the sequence number i associated with the radio bearer identified by the DRB IDm is activated. For example, when the value is "1", it indicates that the transmission path with a sequence number i is activated; and when the value is "0", it indicates that the transmission path with a sequence number i is deactivated. Numbering rules for transmission paths associated with a radio bearer are: transmission paths in different cell groups are numbered in ascending order of cell group identifiers; and transmission paths in the same cell group are numbered in ascending order according to LCIDs corresponding to the transmission paths.

Step 2: The UE processes the data duplication function activation or deactivation indication received from the network side device.

Step 2.1: A UE entity receiving the data duplication function activation or deactivation indication delivered by the network side device processes the indication signaling as follows:

Case 1: If the RRC signaling received by the UE indicates that the UE has disabled the data duplication function of a radio bearer, the RRC layer indicates, to the PDCP entity corresponding to the radio bearer, that the data duplication function thereof has been disabled.

Case 2: If the RRC signaling received by the UE reconfigures an available transmission path of the data duplication function of a radio bearer, the RRC layer indicates an available transmission path for subsequent transmission thereof to the PDCP entity corresponding to the radio bearer.

Case 3: If the UE receives a legacy duplication activation/deactivation MAC CE, and the MAC CE instructs the UE to deactivate the data duplication function of a radio bearer, a MAC entity receiving the MAC CE indicates, to a PDCP entity corresponding to the radio bearer, that the data duplication function thereof has been completely deactivated.

Case 4: If the UE receives the data duplication function activation/deactivation MAC CE based on the granularity of the transmission path, the MAC entity receiving the activation/deactivation instruction sends indication information to the PDCP entity corresponding to the radio bearer, where the indication information includes one or a combination of the following:
  m transmission paths in a deactivated state, and
  n transmission paths in an activated state, where m+n≤N.

Step 2.2: The PDCP entity of the UE processes the data duplication function activation/deactivation indication received from the RRC entity or the MAC entity as follows:
  removing the m transmission paths in the deactivated state from the set of available transmission paths of the data duplication function of the radio bearer; and
  adding the n transmission paths in the activated state to the set of available transmission paths of the data duplication function of the radio bearer.

It should be noted that the bearer control method of the embodiments of the present disclosure can be applied to 5G and subsequent evolved communication systems.

In the method of the embodiments of the present disclosure, the network side device can indicate to activate or deactivate the data duplication function of an RB based on the granularity of the bearer, and/or indicate to activate or deactivate the transmission path of an RB based on the granularity of the transmission path, and the UE can control the data transmission on a specific transmission path of a bearer according to the activation or deactivation indication of the network side device, thus improving resource utilization.

Referring to FIG. 6, FIG. 6 is a flowchart 2 of a bearer control method according to an embodiment of the present disclosure. The bearer control method in this embodiment can be applied to a network side device. As shown in FIG. 6, the bearer control method in this embodiment may include the following steps.

Step 601: Send an indication message to a terminal, where the indication message is used to indicate to activate or deactivate the data duplication function of the target radio bearer RB corresponding to the terminal, and/or is used to indicate to activate or deactivate a transmission path of the target RB.

The target RB is configured with a data duplication function, the target RB is configured with N transmission paths, and N is an integer greater than 2.

The indication message optionally is:
  radio resource control RRC signaling; or
  first media access control control element MAC CE signaling, where the first MAC CE signaling is used to indicate to activate or deactivate the data duplication function of the target RB; or
  second MAC CE signaling, where the second MAC CE signaling is used to indicate to activate or deactivate a transmission path of the target RB.

Optionally, the second MAC CE signaling includes: a cell group identifier and/or a logical channel identifier; or the second MAC CE signaling includes: a first field used to identify the target RB, and a second field used to indicate a status of a transmission path whose sequence number is i among the N transmission paths of the target RB;
  where i is an integer greater than or equal to 0 and less than or equal to N.

Optionally, when the target RB is a split bearer, the second MAC CE further includes a split bearer indicator field, used to indicate whether the target RB falls back to a split bearer mode.

It should be noted that this embodiment serves as an implementation of the network side device corresponding to the foregoing method embodiment in FIG. 3. Therefore, reference may be made to related descriptions in the foregoing method embodiment, and same beneficial effects can be achieved. To avoid repeated descriptions, details are not described herein again.

Referring to FIG. 7, FIG. 7 is a structural diagram 1 of a terminal according to an embodiment of the present disclosure. A target radio bearer RB corresponding to the terminal 700 is configured with a data duplication function, the target RB is configured with N transmission paths, N is an integer greater than 2, and as shown in FIG. 7, the terminal 700 includes:
  a receiving module 701, configured to receive an indication message sent by a network side device, where the indication message is used to indicate to activate or deactivate the data duplication function of the target RB, and/or is used to indicate to activate or deactivate a transmission path of the target RB; and
  a determining module 702, configured to determine an available transmission path of the target RB according to the indication message.

On the basis of FIG. 7, the following describes modules further included in the terminal 700 and units included in each module.

The indication message optionally is:
radio resource control RRC signaling; or
first media access control control element MAC CE signaling, where the first MAC CE signaling is used to indicate to activate or deactivate the data duplication function of the target RB; or
second MAC CE signaling, where the second MAC CE signaling is used to indicate to activate or deactivate a transmission path of the target RB.

Optionally, the second MAC CE signaling includes: a cell group identifier and/or a logical channel identifier; or the second MAC CE signaling includes: a first field used to identify the target RB, and a second field used to indicate a status of a transmission path whose sequence number is i among the N transmission paths of the target RB;
where i is an integer greater than or equal to 0 and less than or equal to N.

Optionally, when the target RB is a split bearer, the second MAC CE further includes a split bearer indicator field, used to indicate whether the target RB falls back to a split bearer mode.

Optionally, the determining module 702 includes:
a sending unit, configured to send, by an entity receiving the indication message in the terminal 700, indication information to a PDCP entity corresponding to the target RB, where the indication information is determined according to the indication message; and
a determining unit, configured to determine, by the PDCP entity, the available transmission path of the target RB according to the indication information.

Optionally, when the indication message is RRC signaling and the RRC signaling indicates to deactivate the data duplication function of the target RB, the entity receiving the indication message is an RRC entity, and the indication information is used to indicate that the data duplication function of the target RB is already deactivated.
The determining module 702 is specifically configured to:
determine a transmission path of the target RB preconfigured by the network side device as the available transmission path of the target RB according to the indication information; or
when the target RB is a split bearer, control, according to the indication information, the target RB to switch to a split bearer mode, and determine a transmission path in the split bearer mode as the available transmission path of the target RB.

Optionally, when the indication message is RRC signaling and the RRC signaling indicates to activate j transmission paths of the target RB, the entity receiving the indication message is an RRC entity, the indication information includes the j transmission paths, and j is a positive integer less than or equal to N.
The determining module 702 is specifically configured to:
determine the j transmission paths as the available transmission path of the target RB.

Optionally, when the indication message is first MAC CE signaling and the first MAC CE signaling indicates to deactivate the data duplication function of the target RB, the entity receiving the indication message is a MAC entity, and the indication information is used to indicate that the data duplication function of the target RB is already deactivated.
The determining module 702 is specifically configured to:
determine a transmission path of the target RB preconfigured by the network side device as the available transmission path of the target RB according to the indication information; or
when the target RB is a split bearer, control, according to the indication information, the target RB to switch to a split bearer mode, and determine a transmission path in the split bearer mode as the available transmission path of the target RB.

Optionally, when the indication message is second MAC CE signaling, the entity receiving the indication message is a MAC entity, the indication information includes: m transmission paths in a deactivated state and/or n transmission paths in an activated state, m and n are positive integers, m+n≤N, and the m transmission paths in the deactivated state and/or the n transmission paths in the activated state are determined according to the second MAC CE signaling.
The determining module 702 is specifically configured to:
when the indication information includes the n transmission paths in the activated state, determine the n transmission paths in the activated state as the available transmission path of the target RB; or
when the indication information includes only the m transmission paths in the deactivated state, determine a transmission path among the N transmission paths of the target RB other than the m transmission paths in the deactivated state as the available transmission path.

The terminal 700 can implement each process in the foregoing method embodiments in FIG. 3 in the present disclosure, and achieve same beneficial effects. To avoid repetition, details are not described herein again.

Figure 8:
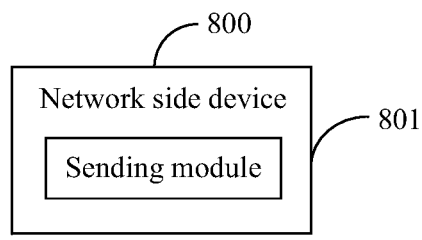
FIG. 8 is a structural diagram 1 of a network side device according to an embodiment of the present disclosure.

Referring to FIG. 8, FIG. 8 is a structural diagram 1 of a network side device according to an embodiment of the present disclosure. As shown in FIG. 8, the network side device 800 includes:
a sending module 801, configured to send an indication message to a terminal, where the indication message is used to indicate to activate or deactivate the data duplication function of the target radio bearer RB corresponding to the terminal, and/or is used to indicate to activate or deactivate a transmission path of the target RB;
where the target RB is configured with a data duplication function, the target RB is configured with N transmission paths, and N is an integer greater than 2.

The indication message optionally is:
radio resource control RRC signaling; or
first media access control control element MAC CE signaling, where the first MAC CE signaling is used to indicate to activate or deactivate the data duplication function of the target RB; or
second MAC CE signaling, where the second MAC CE signaling is used to indicate to activate or deactivate a transmission path of the target RB.

Optionally, the second MAC CE signaling includes: a cell group identifier and/or a logical channel identifier; or the second MAC CE signaling includes: a first field used to identify the target RB, and a second field used to indicate a status of a transmission path whose sequence number is i among the N transmission paths of the target RB;
where i is an integer greater than or equal to 0 and less than or equal to N.

Optionally, when the target RB is a split bearer, the second MAC CE further includes a split bearer indicator field, used to indicate whether the target RB falls back to a split bearer mode.

The network side device 800 can implement each process in the foregoing method embodiments in FIG. 6 in the present disclosure, and achieve same beneficial effects. To avoid repetition, details are not described herein again.

Figure 9:
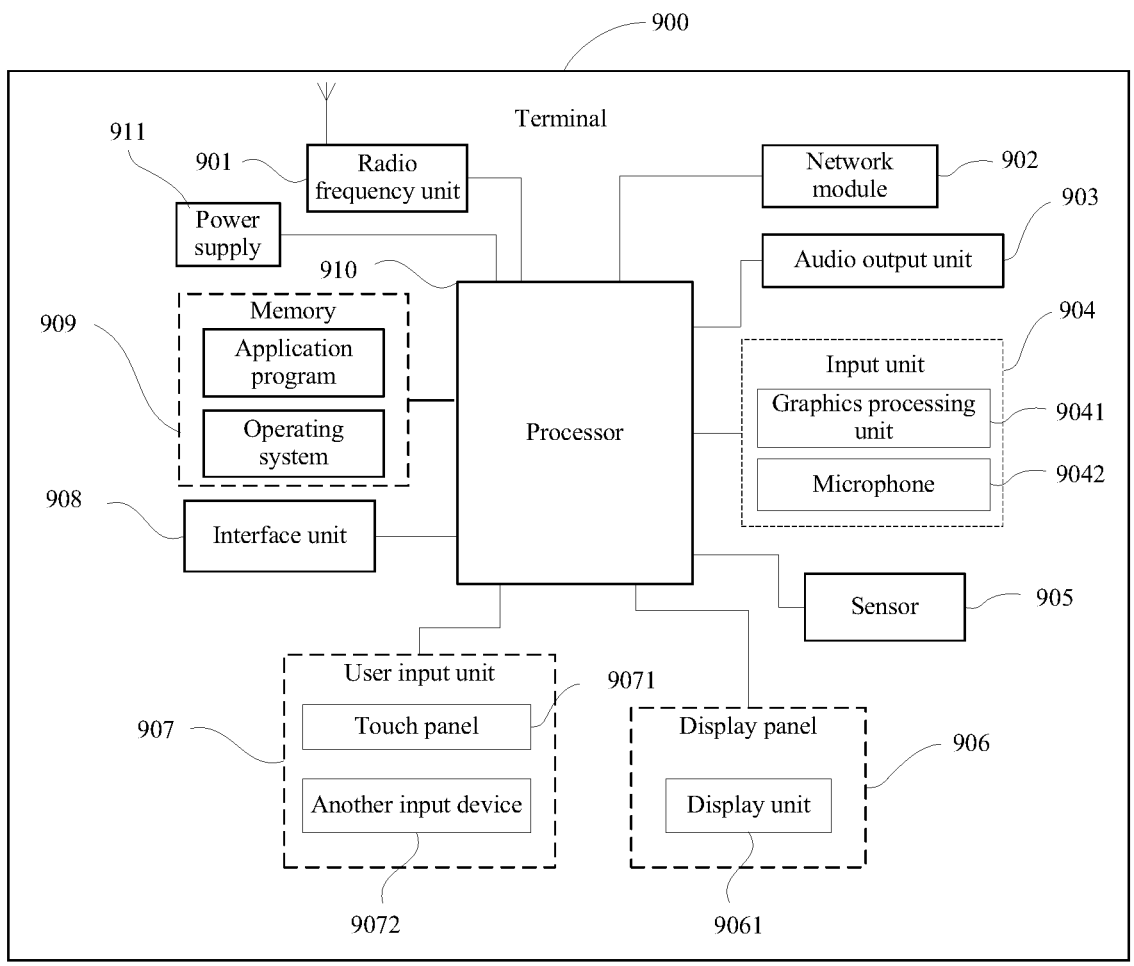
FIG. 9 is a structural diagram 2 of a terminal according to an embodiment of the present disclosure.

Referring to FIG. 9, FIG. 9 is a structural diagram 2 of a terminal according to an embodiment of the present disclosure. The terminal may be hardware of a terminal for implementing the embodiments of the present disclosure. A target radio bearer RB corresponding to the terminal 900 is configured with a data duplication function, the target RB is configured with N transmission paths, and N is an integer greater than 2. As shown in FIG. 9, the terminal 900 includes but is not limited to: a radio frequency unit 901, a network module 902, an audio output unit 903, an input unit 904, a sensor 905, a display unit 906, a user input unit 907, an interface unit 908, a memory 909, a processor 910, a power supply 911, and the like. Those skilled in the art may understand that the terminal structure shown in FIG. 9 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 901 is configured to receive an indication message sent by a network side device, where the indication message is used to indicate to activate or deactivate the data duplication function of the target RB, and/or is used to indicate to activate or deactivate a transmission path of the target RB.

The processor 910 is configured to determine an available transmission path of the target RB according to the indication message.

The indication message optionally is:
radio resource control RRC signaling; or
first media access control control element MAC CE signaling, where the first MAC CE signaling is used to indicate to activate or deactivate the data duplication function of the target RB; or
second MAC CE signaling, where the second MAC CE signaling is used to indicate to activate or deactivate a transmission path of the target RB.

Optionally, the second MAC CE signaling includes: a cell group identifier and/or a logical channel identifier; or the second MAC CE signaling includes: a first field used to identify the target RB, and a second field used to indicate a status of a transmission path whose sequence number is i among the N transmission paths of the target RB;
where i is an integer greater than or equal to 0 and less than or equal to N.

Optionally, when the target RB is a split bearer, the second MAC CE further includes a split bearer indicator field, used to indicate whether the target RB falls back to a split bearer mode.

Optionally, the processor 910 is further configured to:
send, by an entity receiving the indication message in the terminal, indication information to a PDCP entity corresponding to the target RB, where the indication information is determined according to the indication message; and
determine, by the PDCP entity, the available transmission path of the target RB according to the indication information.

Optionally, when the indication message is RRC signaling and the RRC signaling indicates to deactivate the data duplication function of the target RB, the entity receiving the indication message is an RRC entity, and the indication information is used to indicate that the data duplication function of the target RB is already deactivated.

The processor 910 is further configured to:
determine a transmission path of the target RB preconfigured by the network side device as the available transmission path of the target RB according to the indication information; or
when the target RB is a split bearer, control, according to the indication information, the target RB to switch to a split bearer mode, and determine a transmission path in the split bearer mode as the available transmission path of the target RB.

Optionally, when the indication message is RRC signaling and the RRC signaling indicates to activate j transmission paths of the target RB, the entity receiving the indication message is an RRC entity, the indication information includes the j transmission paths, and j is a positive integer less than or equal to N.

The processor 910 is further configured to:
determine the j transmission paths as the available transmission path of the target RB.

Optionally, when the indication message is first MAC CE signaling and the first MAC CE signaling indicates to deactivate the data duplication function of the target RB, the entity receiving the indication message is a MAC entity, and the indication information is used to indicate that the data duplication function of the target RB is already deactivated.

The processor 910 is further configured to:
determine a transmission path of the target RB preconfigured by the network side device as the available transmission path of the target RB according to the indication information; or
when the target RB is a split bearer, control, according to the indication information, the target RB to switch to a split bearer mode, and determine a transmission path in the split bearer mode as the available transmission path of the target RB.

Optionally, when the indication message is second MAC CE signaling, the entity receiving the indication message is a MAC entity, the indication information includes: m transmission paths in a deactivated state and/or n transmission paths in an activated state, m and n are positive integers, m+n≤N, and the m transmission paths in the deactivated state and/or the n transmission paths in the activated state are determined according to the second MAC CE signaling.

The processor 910 is further configured to:
when the indication information includes the n transmission paths in the activated state, determine the n transmission paths in the activated state as the available transmission path of the target RB; or
when the indication information includes only the m transmission paths in the deactivated state, determine a transmission path among the N transmission paths of the target RB other than the m transmission paths in the deactivated state as the available transmission path.

It should be noted that the terminal 900 in this embodiment can implement each process in the method embodiment corresponding to FIG. 3 in the embodiments of the present disclosure, and achieve same beneficial effects. To avoid repetition, details are not described herein again.

It should be understood that, in embodiments of the present disclosure, the radio frequency unit 901 may be configured to receive and send information or receive and send a signal in a call process. Specifically, after receiving downlink data from a base station, the radio frequency unit 901 sends the downlink data to the processor 910 for processing. In addition, the radio frequency unit 901 sends uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with another device by using a wireless communications system and network.

The terminal provides wireless broadband Internet access for a user by using the network module 902, for example, helping the user send and receive an email, browsing a web page, and accessing streaming media.

The audio output unit 903 may convert audio data received by the radio frequency unit 901 or the network module 902 or stored in the memory 909 into an audio signal and output the audio signal as a sound. In addition, the audio output unit 903 may further provide audio output (for example, a call signal received voice, or a message received voice) related to a specific function executed by the terminal 900. The audio output unit 903 includes a loudspeaker, a buzzer, a receiver, and the like.

The input unit 904 is configured to receive an audio signal or a video signal. The input unit 904 may include a graphics processing unit (Graphics Processing Unit, GPU) 9041 and a microphone 9042. The graphics processing unit 9041 processes image data of a static picture or a video obtained by an image capturing apparatus (for example, a camera) in video capturing mode or image capturing mode. A processed image frame can be displayed on the display unit 906. The image frame processed by the graphics processing unit 9041 may be stored in the memory 909 (or another storage medium) or sent by using the radio frequency unit 901 or the network module 902. The microphone 9042 can receive sound and can process such sound into audio data. The audio data obtained through processing may be converted, in a telephone call mode, into a format that can be sent to a mobile communications base station via the radio frequency unit 901 for output.

The terminal 900 further includes at least one sensor 905, such as a light sensor, a motion sensor, and other sensors. Specifically, the light sensor includes an ambient light sensor and a proximity sensor, where the ambient light sensor can adjust brightness of the display panel 9061 based on brightness of ambient light, and the proximity sensor can turn off the display panel 9061 and/or backlight when the terminal 900 moves towards the ear. As a type of motion sensor, the acceleration sensor can detect a value of an acceleration in each direction (generally three axes), and detect a value and a direction of gravity when the acceleration sensor is static, and may be configured to recognize a terminal posture (for example, switching between a landscape screen and a portrait screen, relevant games, and magnetometer posture calibration) and perform a function related to vibration recognition (such as a pedometer or a knock), and the like. The sensor 905 may further include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information entered by a user or information provided for the user. The display unit 906 may include the display panel 9061. The display panel 9061 may be configured in a form of a liquid crystal display (Liquid Crystal Display, LCD), an organic light-emitting diode (Organic Light-Emitting Diode, OLED), or the like.

The user input unit 907 may be configured to receive input numeral or character information, and generate key signal input related to user setting and function control of the terminal. Specifically, the user input unit 907 includes a touch panel 9071 and another input device 9072. The touch panel 9071 is also referred to as a touchscreen, and may collect a touch operation performed by a user on or near the touch panel 9071 (such as an operation performed by a user on the touch panel 9071 or near the touch panel 9071 by using any proper object or accessory, such as a finger or a stylus). The touch panel 9071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 910, receives a command sent by the processor 910, and executes the command. In addition, the touch panel 9071 may be implemented by using a plurality of types such as a resistive type, a capacitive type, an infrared ray, and a surface acoustic wave. The user input unit 907 may further include another input device 9072 in addition to the touch panel 9071. Specifically, the another input device 9072 may include, but is not limited to, a physical keyboard, function keys (such as a volume control key and a switch key), a trackball, a mouse, and a joystick. Details are not described herein.

Further, the touch panel 9071 can cover the display panel 9061. When detecting a touch operation on or near the touch panel 9071, the touch panel 9071 transmits the touch operation to the processor 910 to determine a type of a touch event. Then, the processor 910 provides corresponding visual output on the display panel 9061 based on the type of the touch event. In FIG. 9, the touch panel 9071 and the display panel 9061 are used as two independent components to implement input and output functions of the terminal. However, in some embodiments, the touch panel 9071 and the display panel 9061 may be integrated to implement the input and output functions of the terminal. This is not specifically limited herein.

The interface unit 908 is an interface connecting an external apparatus to the terminal 900. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, and a headset port. The interface unit 908 may be configured to receive an input (for example, data information and power) from an external apparatus and transmit the received input to one or more elements within the terminal 900, or may be configured to transmit data between the terminal 900 and the external apparatus.

The memory 909 may be configured to store software programs and various data. The memory 909 may mainly include a program storage area and a data storage area. The program storage area may store an operating system, an application program required by at least one function (such as a sound play function or an image display function), and the like. The data storage area may store data (such as audio data or an address book) or the like created based on use of the mobile phone. In addition, the memory 909 may include a high-speed random access memory, and may further include a non-volatile memory, such as at least one magnetic disk storage device, a flash memory device, or another volatile solid-state storage device.

The processor 910 is a control center of the terminal, and connects all parts of the entire terminal by using various interfaces and lines. By running or executing a software program and/or a module stored in the memory 909 and invoking data stored in the memory 909, the processor 910 performs various functions of the terminal and data processing, to perform overall monitoring on the terminal. The processor 910 may include one or more processing units. Optionally, the processor 910 may be integrated with an application processor and a modem processor. The application processor mainly processes the operating system, the user interface, applications, etc. The modem processor mainly processes wireless communication. It may be understood that, alternatively, the modem processor may not be integrated into the processor 910.

The terminal 900 may further include a power supply 911 (for example, a battery) that supplies power to various components. Optionally, the power supply 911 may be logically connected to the processor 910 by using a power supply management system, to perform functions of managing charging, discharging, and power consumption by using the power supply management system.

In addition, the terminal 900 includes some function modules not shown, and details are not described herein.

Optionally, an embodiment of the present disclosure further provides a terminal, including a processor 910, a memory 909, and a computer program stored in the memory 909 and executable on the processor 910. When the computer program is executed by the processor 910, each process of the foregoing method embodiments in FIG. 3 can be implemented, and same technical effect can be achieved. To avoid repetition, details are not described herein again.

Figure 10:
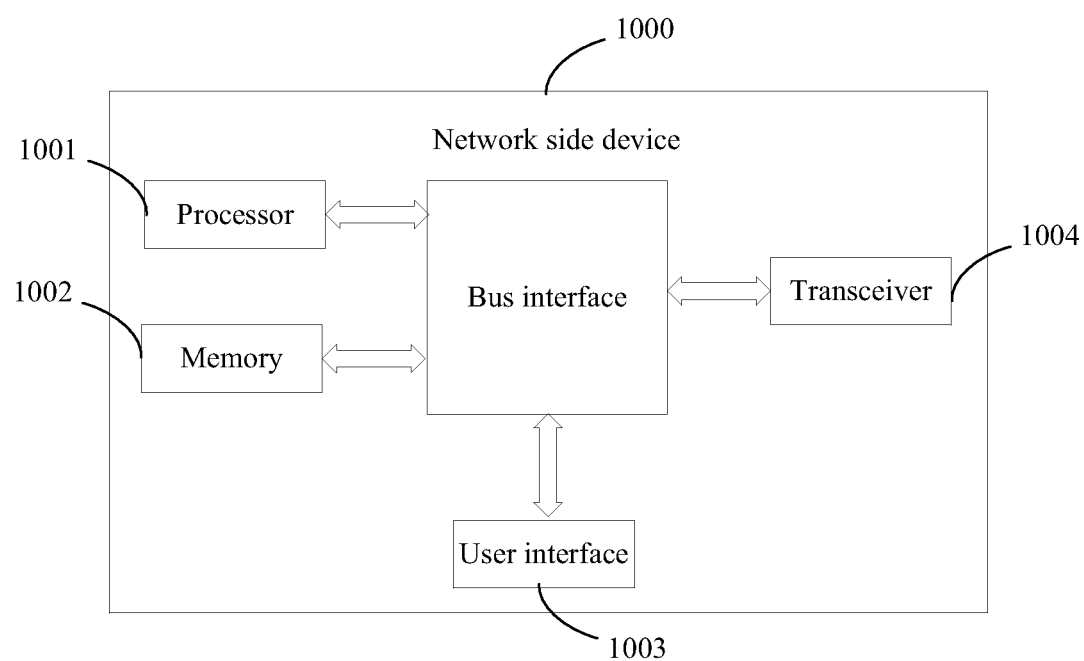
FIG. 10 is a structural diagram 2 of a network side device according to an embodiment of the present disclosure.

Referring to FIG. 10, FIG. 10 is a structural diagram 2 of a network side device according to an embodiment of the present disclosure. As shown in FIG. 10, the network side device 1000 includes a processor 1001, a memory 1002, a user interface 1003, a transceiver 1004, and a bus interface.

In this embodiment of the present disclosure, the network side device 1000 further includes: a computer program stored in the memory 1002 and executable on the processor 1001. When the computer program is executed by the processor 1001, the following step is implemented:

sending an indication message to a terminal, where the indication message is used to indicate to activate or deactivate the data duplication function of the target radio bearer RB corresponding to the terminal, and/or is used to indicate to activate or deactivate a transmission path of the target RB;

where the target RB is configured with a data duplication function, the target RB is configured with N transmission paths, and N is an integer greater than 2.

The indication message optionally is:

radio resource control RRC signaling; or first media access control control element MAC CE signaling, where the first MAC CE signaling is used to indicate to activate or deactivate the data duplication function of the target RB; or second MAC CE signaling, where the second MAC CE signaling is used to indicate to activate or deactivate a transmission path of the target RB.

Optionally, the second MAC CE signaling includes: a cell group identifier and/or a logical channel identifier; or the second MAC CE signaling includes: a first field used to identify the target RB, and a second field used to indicate a status of a transmission path whose sequence number is i among the N transmission paths of the target RB;

where i is an integer greater than or equal to 0 and less than or equal to N.

Optionally, when the target RB is a split bearer, the second MAC CE further includes a split bearer indicator field, used to indicate whether the target RB falls back to a split bearer mode.

In FIG. 10, a bus architecture can include any quantity of interconnected buses and bridges, which are specifically connected together by circuits of one or more processors represented by the processor 1001 and a memory represented by the memory 1002. The bus architecture may further link various other circuits such as a peripheral device, a voltage regulator, and a power management circuit together. These are all well-known in the art, and therefore are not further described in this specification. The bus interface provides an interface. The transceiver 1004 may be a plurality of components. To be specific, the transceiver 1004 includes a transmitter and a receiver, and provides a unit configured to communicate with various other apparatuses on a transmission medium. For different user equipment, the user interface 1003 may alternatively be an interface for externally and internally connecting a required device. The connected device includes, but not limited to, a keypad, a display, a loudspeaker, a microphone, a joystick, and the like.

The processor 1001 is responsible for management of a bus architecture and general processing. The memory 1002 may store data used when the processor 1001 performs an operation.

The network side device 1000 can implement each process implemented by the network side device in the foregoing method embodiments in FIG. 6. To avoid repetition, details are not described herein again.

The embodiments of the present disclosure further provide a computer-readable storage medium. The computer-readable storage medium stores a computer program, and when the computer program is executed by a processor, the processes in the method embodiment shown in FIG. 3 or FIG. 6 are implemented, and a same technical effect can be achieved. To avoid repetition, details are not described herein. The computer-readable storage medium includes a read-only memory (Read-Only Memory, ROM for short), a random access memory (Random Access Memory, RAM for short), a magnetic disk, an optical disc, or the like.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A bearer control method, applied to a terminal, wherein a target radio bearer RB corresponding to the terminal is configured with a data duplication function, the target RB is configured with N transmission paths, N is an integer greater than 2, and the method comprises:
   receiving an indication message sent by a network side device, wherein the indication message is used to indicate to activate or deactivate duplication-function, of the transmission path of the target RB; and
   determining an available transmission path of the target RB according to the indication message;
   wherein the indication message comprises second MAC CE signaling, wherein the second MAC CE signaling is used to indicate to activate or deactivate duplication function of the transmission path of the target RB;
   wherein the second MAC CE signaling comprises: a first field used to identify the target RB, and a second field used to indicate a status of a transmission path whose sequence number is i among the N transmission paths of the target RB;
   wherein i is an integer greater than or equal to 0 and less than or equal to N;
   wherein the determining an available transmission path of the target RB according to the indication message comprises:
   sending, by a MAC entity in the terminal, indication information to a PDCP entity corresponding to the target RB, wherein the indication information is determined according to the second MAC CE signaling; and
   determining, by the PDCP entity, the available transmission path of the target RB according to the indication information;
   wherein the indication information comprises: m transmission paths in a deactivated state and/or n transmission paths in an activated state, m and n are positive integers, m+n≤N, and the m transmission paths in the deactivated state and/or the n transmission paths in the activated state are determined according to the second MAC CE signaling; and
   the determining, by the PDCP entity, the available transmission path of the target RB according to the indication information comprises:
   when the indication information comprises the n transmission paths in the activated state, determining the n transmission paths in the activated state as the available transmission path of the target RB; or
   when the indication information comprises only the m transmission paths in the deactivated state, determining a transmission path among the N transmission paths of the target RB other than the m transmission paths in the deactivated state as the available transmission path.

2. The method according to claim 1, wherein when the target RB is a split bearer, the second MAC CE further comprises a split bearer indicator field, used to indicate whether the target RB falls back to a split bearer mode.

3. A terminal, comprising a processor, a memory, and a computer program stored in the memory and executable on the processor, wherein a target radio bearer RB corresponding to the terminal is configured with a data duplication function, the target RB is configured with N transmission paths, N is an integer greater than 2, wherein the computer program, when executed by the processor, implements a bearer control method comprising:
   receiving an indication message sent by a network side device, wherein the indication message is used to indicate to activate or deactivate duplication function of the transmission path of the target RB; and
   determining an available transmission path of the target RB according to the indication message;
   wherein the indication message comprises second MAC CE signaling, wherein the second MAC CE signaling is used to indicate to activate or deactivate duplication function of the transmission path of the target RB;
   wherein the second MAC CE signaling comprises: a first field used to identify the target RB, and a second field used to indicate a status of a transmission path whose sequence number is i among the N transmission paths of the target RB;
   wherein i is an integer greater than or equal to 0 and less than or equal to N;
   wherein the determining an available transmission path of the target RB according to the indication message comprises:
   sending, by a MAC entity in the terminal, indication information to a PDCP entity corresponding to the target RB, wherein the indication information is determined according to the second MAC signaling; and
   determining, by the PDCP entity, the available transmission path of the target RB according to the indication information;
   wherein the indication information comprises: m transmission paths in a deactivated state and/or n transmission paths in an activated state, m and n are positive integers, m-+n≤N, and the m transmission paths in the deactivated state and/or the n transmission paths in the activated state are determined according to the second MAC CE signaling; and
   the determining, by the PDCP entity, the available transmission path of the target RB according to the indication information comprises:
   when the indication information comprises the n transmission paths in the activated state, determining the n transmission paths in the activated state as the available transmission path of the target RB; or
   when the indication information comprises only the i transmission paths in the deactivated state, determining a transmission path among the N transmission paths of the target RB other than the n transmission paths in the deactivated state as the available transmission path.

4. The terminal according to claim 3, wherein when the target RB is a split bearer, the second MAC CE further comprises a split bearer indicator field, used to indicate whether the target RB falls back to a split bearer mode.

5. A non-transitory computer-readable storage medium, wherein the computer-readable storage medium stores a computer program, and the computer program, when executed by a processor, implements the steps of the bearer control method according to claim 1.

* * * * *